United States Patent [19]

Yamazaki

[11] 4,451,899

[45] May 29, 1984

[54] DISPLAY APPARATUS FOR SIMULTANEOUS DISPLAY OF CHARACTER INFORMATION HAVING DIFFERENT CHARACTER PITCHES

[75] Inventor: Isao Yamazaki, Tokyo, Japan

[73] Assignee: Sony Corporation, Tokyo, Japan

[21] Appl. No.: 331,546

[22] Filed: Dec. 16, 1981

[30] Foreign Application Priority Data

Dec. 16, 1980 [JP] Japan ................................ 55-177736

[51] Int. Cl.$^3$ ................................................ G06F 3/14

[52] U.S. Cl. .................................... 364/900; 340/731

[58] Field of Search ............... 340/723, 724, 731, 750; 364/200 MS File, 900 MS File, 518, 521, 523

[56] References Cited

U.S. PATENT DOCUMENTS

| | | | |
|---|---|---|---|
| Re. 30,679 | 7/1981 | Evans et al. | 364/523 |
| 3,648,271 | 3/1972 | McConnell et al. | 340/731 |
| 3,999,168 | 12/1976 | Findley et al. | 364/900 |
| 4,079,458 | 3/1978 | Rider et al. | 364/900 |
| 4,107,664 | 8/1978 | Marino | 340/731 |
| 4,107,665 | 8/1978 | Mayer et al. | 340/731 |
| 4,107,786 | 8/1978 | Masaki et al. | 364/900 |
| 4,193,071 | 3/1980 | Hasegawa et al. | 340/723 |
| 4,204,206 | 5/1980 | Bakula et al. | 364/900 |
| 4,283,724 | 8/1981 | Edwards | 340/731 |
| 4,342,096 | 7/1982 | McDevitt | 364/900 |

*Primary Examiner*—Charles E. Atkinson
*Assistant Examiner*—Mark P. Watson
*Attorney, Agent, or Firm*—Lewis H. Eslinger; Alvin Sinderbrand

[57] ABSTRACT

An information processing apparatus includes a RAM for storing character information and character pitch information corresponding thereto; a CRT for simultaneously displaying character information having different character pitches; line buffers supplied with the information from the RAM; a character pitch switching circuit for producing a character pitch or load clock signal in response to the character pitch information stored in the RAM; a memory address counter for reading out the contents of the line buffers at a rate determined by the character pitch clock signal; an address setting circuit for producing an address signal for a horizontal scroll operation in which the displayed characters are shifted in the horizontal direction on the screen; start address registers for determining how many characters to shift in response to the address signal and in accordance with the character pitch with which each is associated; and a selecting circuit for gating the output from only one of the start address registers, in response to the character pitch information in the RAM, to the memory address counter which controls which character is to be read first from the line buffers.

10 Claims, 17 Drawing Figures

FIG. 5

| | LINE PITCH | CONSTANT |
|---|---|---|
| LP1 | 6 LINES/INCH | 2 |
| LP2 | 4 LINES/INCH | 3 |
| LP3 | 3 LINES/INCH | 4 |
| LP4 | 2 LINES/INCH | 6 |

FIG. 6

| BEFORE ADJUSTMENT | | AFTER ADJUSTMENT | |
|---|---|---|---|
| LINE PITCH CONSTANT OF LAST LINE | SHORTAGE FOR SUM OF THE CONSTANT OF 64 | LINE PITCH CONSTANT OF LAST LINE | SHORTAGE FOR SUM OF THE CONSTANT OF 64 |
| 2 | 1 | (2) → (3) | 0 |
| 3 | 1 | (3) → (2) + 2DL | 0 |
| | 2 | 2DL | 0 |
| 4 | 1 | (4) → (3) + 2DL | 0 |
| | 2 | 2DL | 0 |
| | 3 | 3DL | 0 |
| 6 | 1 | (6) → (4) + 3DL | 0 |
| | 2 | 2DL | 0 |
| | 3 | 3DL | 0 |
| | 4 | 2DL + 2DL | 0 |
| | 5 | 2DL + 3DL | 0 |

DISPLAY APPARATUS FOR SIMULTANEOUS DISPLAY OF CHARACTER INFORMATION HAVING DIFFERENT CHARACTER PITCHES

BACKGROUND OF THE INVENTION

1. Field of the Invention

This invention relates generally to information processing apparatus and, more particularly, is directed to word processing apparatus for processing information having different character and line pitches.

2. Description of the Prior Art

Word processing apparatus which are adapted to edit typed characters and words displayed on the screen of a CRT (cathode ray tube or Braun tube) and type out such edited characters and words by means of an electrically controllable typewriter or other printing apparatus, are well known in the art. Generally, in such apparatus, character information is stored in a memory of the apparatus as character code data. When it is desired to display the information on the screen of the CRT, the character code data is sequentially read out from the memory in synchronism with the scanning operation by the CRT, converted by a character generator to dot data representing characters to be displayed, and such dot data is then supplied to the CRT, whereupon the characters are displayed on the screen thereof. Various editing operations can then be performed on the character information displayed by the CRT.

Because of the increase in complexity of information to be processed, it may be required to display information having different character pitches, that is, different spacings between the characters in a horizontal line, on the screen of the CRT. Generally, however, the character pitch for all of the information displayed at any given time on the CRT screen is fixed by the hardware of the apparatus. Thus, although information having different character pitches can by typed out by the printer or typewriter used with the apparatus, information with only one character pitch can be displayed on the CRT screen.

Even if information having different character pitches can be displayed on the CRT screen, a problem results during a horizontal scroll operation, that is, when the displayed information is shifted in the horizontal direction on the screen. During such operation, the information displayed on the CRT screen is shifted character by character in the horizontal direction of the screen. Since the horizontal scroll operation is generally accomplished by shifting a determined number of characters in each line in the horizontal direction, a problem occurs when different character pitches are used in different lines. In such case, the relative positions between the characters of the different lines, and the lines themselves, are shifted when the displayed information is scrolled in the horizontal direction.

OBJECTS AND SUMMARY OF THE INVENTION

Accordingly, it is an object of this invention to provide an information processing apparatus that avoids the above-described difficulties encountered with the prior art.

More particularly, it is an object of this invention to provide an information processing apparatus which is adapted to simultaneously display information having different character pitches on the same CRT screen.

It is a further object of this invention to provide an information processing apparatus which is adapted to perform a horizontal scroll operation with respect to information displayed on a CRT screen.

It is a still further object of this invention to provide an information processing apparatus which is adapted to perform a horizontal scroll operation with respect to information having different character pitches simultaneously displayed on the same CRT screen.

It is yet a further objection of this invention to provide an information processing apparatus which is adapted to perform a horizontal scroll operation with respect to information having different character pitches simultaneously displayed on the same CRT screen, while maintaining the same relative positions between the characters of different lines and between the lines themselves.

In accordance with an aspect of this invention, an information processing apparatus includes memory means for storing character information and character pitch information corresponding thereto; display means adapted to simultaneously display character information having different character pitches; and control means for controlling the display means to display the character information stored by the memory means with a character pitch determined by the character pitch information corresponding to the respective displayed character information.

The above, and other, objects, features and advantages of the invention, will be apparent in the following detailed description of an illustrative embodiment of the invention which is to be read in connection with the accompanying drawings.

BRIEF DESCRIPTION OF THE DRAWINGS

FIGS. 5 and 6 are tables used for explaining the vertical scroll operation with the apparatus of FIG. 2;

DETAILED DESCRIPTION OF A PREFERRED EMBODIMENT

Figure 1:
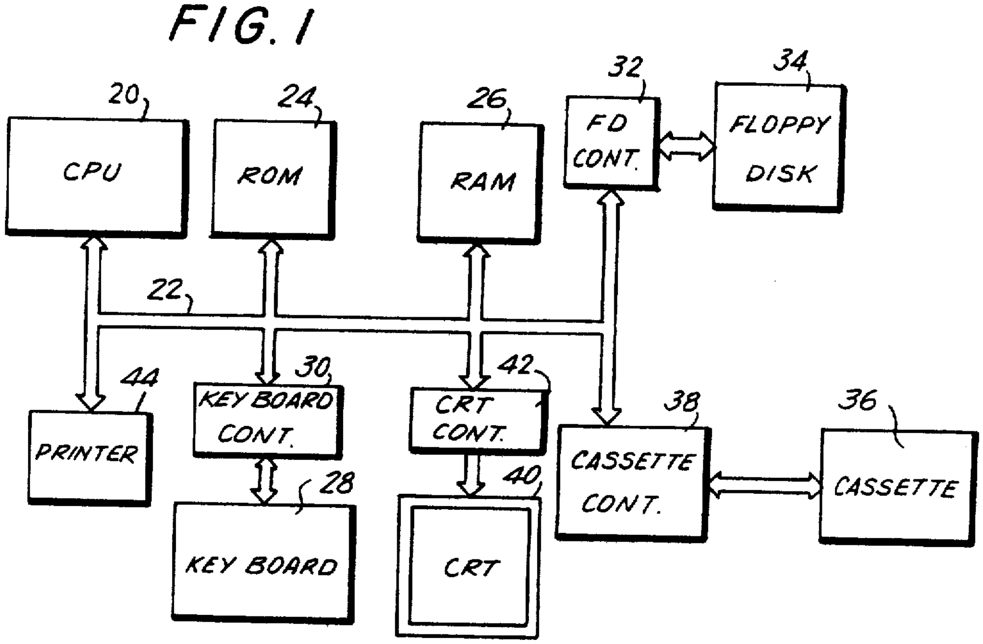
FIG. 1 is a block diagram of an information processing apparatus according to one embodiment of this invention.

Referring to the drawings in detail, and initially to FIG. 1 thereof, an information processing apparatus according one embodiment of the present invention includes a central processing unit (CPU) 20 connected through a main bus line 22 to a read only memory (ROM) 24 which includes a word processing program previously read or loaded therein at the start of the operation of the word processing apparatus for use in the monitoring and operating systems of the apparatus. CPU 20 is also connected through bus line 22 to a random access memory (RAM) 26 having an area for direct memory access (DMA) and which is used as a work area, a program area and for storage of information to be displayed. A keyboard 28 including keys of the type normally found on conventional English-language typewriters, function keys and the like is connected to the aforementioned bus line 22 through a keyboard control device 30. Keyboard 28 is used for the input and control of information in the apparatus. A disk control circuit 32 is also provided for controlling a magnetic medium 34, such as a diskette or floppy disk, and is connected to the aforementioned bus line 22 so as to control the reading out and writing in of information from the magnetic disks. In addition, information previously stored on the magnetic tape of a cassette 36 can be supplied to the apparatus through a cassette control device 38 and bus line 22. The apparatus shown in FIG. 1 further includes a CRT 40 having a screen for displaying desired information and a CRT control device 42 connected to bus line 22 and which controls the display of information by CRT 40. A printing device 44 is also connected to bus line 22 for printing out desired information.

With the above arrangement, input character information from keyboard 28 is supplied through keyboard control device 30 and bus line 22 to CPU 20 which encodes the character information and supplies such encoded information to RAM 26 for storage therein. The encoded character information is also displayed on the screen of CRT 40. After the input character information has been edited, that is, typing errors and the like have been corrected, CPU 20 causes the encoded character information stored in RAM 26 to be sequentially read out therefrom and recorded on floppy disk 34. When it is desired to reproduce the recorded information, CPU 20 causes the encoded signal recorded on floppy disk 34 to be written into RAM 26 and, at the same time, displayed on CRT 40 and, if desired, printed out as a hard copy by printing device 44. Alternatively, information previously recorded on the magnetic tape of cassette 36 may be reproduced in the same manner as the information recorded on floppy disk 34. It is to be appreciated that, although cassette 36 has only been discussed as having information previously recorded thereon, it may be possible to use cassette 36 in the same manner as floppy disk 34, that is, for both recording and reproducing.

Figure 3:
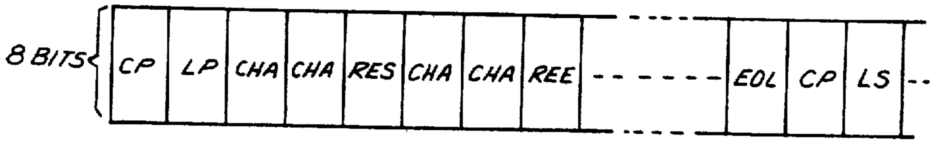
FIG. 3 is a schematic diagram used for explaining the storage of character information in the RAM of the CRT control circuit of FIG. 2.
Figure 2:
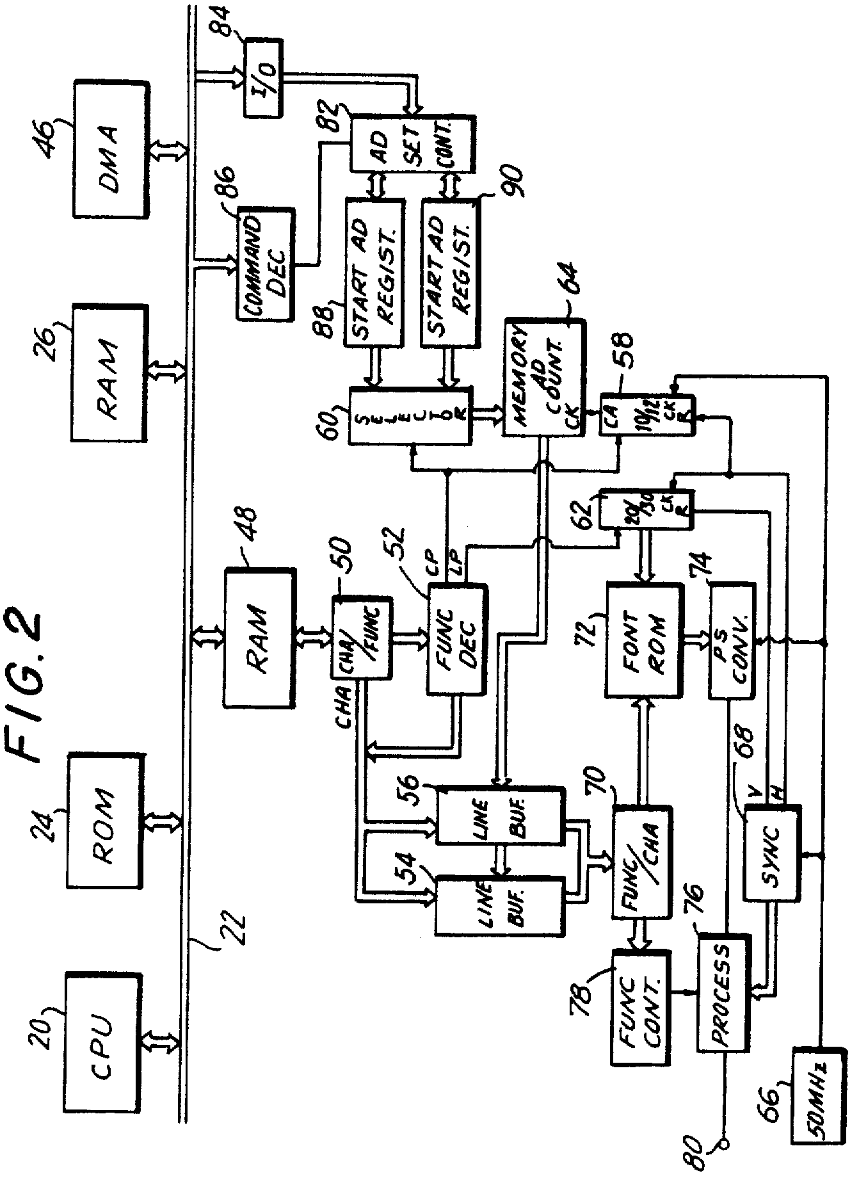
FIG. 2 is a more detailed block diagram of the CRT control circuit of FIG. 1 according to one embodiment of this invention.

Referring now to FIG. 2, there is shown a portion of the apparatus of FIG. 1, namely, CPU 20, ROM 24 and RAM 26, with the remainder of the apparatus disclosed forming part of CRT control device 42. As shown therein, CRT control device 42 includes a direct memory access (DMA) circuit 46 having a storage area and which is adapted to directly transfer information to and from its storage area without passing through CPU 20. A random access memory (RAM) 48 is connected through bus line 22 to CPU 20 and stores character information displayed on the screen of CRT 40 as encoded character information. The data stored in RAM 48 is arranged in the format shown in FIG. 3 for each horizontal line of information. In particular, each horizontal line of information includes information regarding the character pitch, represented by an 8-bit character pitch code CP, corresponding to the spacing between characters in each line, for example, 10 characters/inch and 12 characters/inch. In like manner, an 8-bit line pitch code LP is also provided for designating the spacing between adjacent lines. For example, the line pitch may be 6 lines/inch, 4 lines/inch, 3 lines/inch and 2 lines/inch. Each 8-bit block of reference letters CHA represents a single character stored in RAM 48. In order to more distinctly define the character information, various functions are associated with each character or group of characters. As an example, the 8-bit blocks RES and REE represent reverse start and reverse end operations in which the color used for the display of the characters between these blocks and the color used in the display background are reversed. For example, if the screen of CRT 40 has a dark or black background and the characters are normally displayed thereon with a light or white shade, the characters between the RES and REE blocks are displayed with a black or dark shade on a white or light background on the screen of CRT 40. In this manner, such characters are highlighted with respect to the remainder of the information displayed by CRT 40. Other functions that may be displayed with respect to the character information are the single underline (SU) function, the double underline (DU) function, the bold character (BO) function, and the like. When the end of a line of character information stored in RAM 48 occurs, an 8-bit end of line code EOL is produced. It is to be appreciated that a maximum number of characters and functions can be assigned to each line, for example, 128 characters and 22 functions. An end of line code EOL is produced when the next character in a line is the 129th character. It is to be further appreciated that the above maximum number of characters and functions for a line may be adjusted depending upon the apparatus used, for example, each line may contain a maximum of 158 characters and 34 functions.

Figure 4:
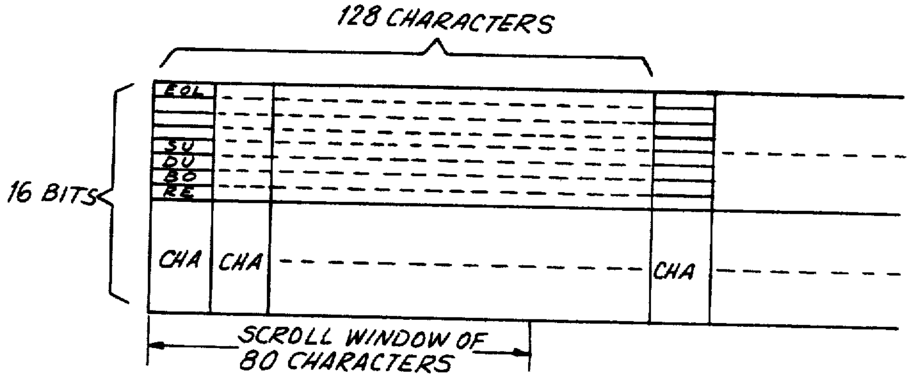
FIG. 4 is a schematic diagram used for explaining the storage of character information in the line buffer memories of the CRT control circuit of FIG. 2.

Referring back to FIG. 2, the encoded character information from RAM 48 is supplied to a character and function separating circuit 50 which separates the encoded character information CHA from the functions related thereto, such as the RE (RES, REE), SU, DU and BO functions, and the character pitch code CP and line pitch code LP, the latter pitch codes being then supplied to a function decoder 52. The encoded character information CHA separated by separating circuit 50 is alternately supplied line by line to line buffers 54 and 56. Function decoder 52 also supplies the function codes RE, SU, DU, BO and the like to line buffers 54 and 56 for each character so that the information stored in line buffers 54 and 56 is in the form shown in FIG. 4. In particular, each of the 8-bit 128 characters in a line has the function data appended thereto as an additional 8-bit block of information. It is to be appreciated that although 128 characters are included in each horizontal line stored in RAM 48, only 80 characters can be displayed in any horizontal line on the screen of CRT 40. Such expanded lines, however, are used in the horizontal scroll operation. The additional 48 characters are, however, not lost on the display screen, but, rather, are merely displayed on the next horizontal line to produce a continuous stream of data on the screen of CRT 40.

The character pitch code CP from function decoder 52 is supplied to a character pitch switching circuit 58 and a selecting circuit 60 and the line pitch code LP from function decoder 52 is supplied to a line pitch switching circuit 62. Selecting circuit 60, in turn, supplies an address signal to a memory address counter 64 which is also supplied at a clock input terminal CK thereof with a character pitch clock signal from character pitch switching circuit 58. This latter circuit includes a clock input terminal CK supplied with a 50 MHz signal from a clock signal generator 66 and a reset input terminal R supplied with a horizontal synchronizing signal H from a synchronizing signal circuit 68 which, in turn, is also supplied with the 50 MHz signal from clock signal generator 66. Accordingly, memory address counter 64 controls line buffers 54 and 56 to cause selected character information stored therein to be read out with the correct character pitch.

The character information read out from line buffers 54 and 56 is supplied to a function and character separating circuit 70 which separates the character code information CHA and the function code information, for example, RE, SU, DU, BO and the like. The separated character code information CHA is supplied to a font read only memory (ROM) 72 which functions as a character generator. In particular, the character code information CHA from separating circuit 70 is supplied as an address signal to ROM 72 which, in turn, supplies a parallel dot video signal to a parallel-to-serial converter 74 which, in turn, converts the parallel dot video signal to a serial dot video signal synchronized with the 50 MHz clock signal generated by clock signal generator 66. The serial dot video signal is then supplied to a processing circuit 76. The separated function code information from separating circuit 70 is supplied through a function control circuit 78 which, in turn, supplies a corresponding signal to processing circuit 76 for processing the character information from parallel-to-serial converter 74 with the corresponding function information from function control circuit 78. In addition, horizontal and vertical synchronizing signals H and V from synchronizing signal circuit 68 are added to the serial dot video signal in processing circuit 76. The output of processing circuit 76 is transmitted through an output terminal 80 to CRT 40 for displaying the character information on the screen thereof.

It is to be appreciated that, if the information displayed by CRT 40 is provided with different character pitches in different lines thereof, during a horizontal scroll operation in which all of the lines are moved to the left or right in the horizontal direction on the screen, misalignment of the lines with different character pitches will result if the horizontal scroll operation is simultaneously performed character by character for all of the lines. Accordingly, CRT control circuit 42 is provided with an address setting circuit 82 for determining the horizontal address to which all of the lines are to be moved during the horizontal scroll operation. In particular, address information from CPU 20 is supplied to address setting circuit 82 through an interface circuit 84. Information regarding the horizontal scroll or shift of character information is supplied as a command signal from CPU 20 to a command decoder 86 which, in turn, supplies decoded address setting information to address setting circuit 82. Accordingly, in response to the address information and the decoded address setting information supplied thereto, address setting circuit 82 provides start address information to memory read start address registers 88 and 90 which select the character from each horizontal line which is to be displayed first, in dependence on the character pitch code CP for such information and, in this manner, results in a horizontal scroll operation being performed. In particular, start address register 88 may be provided for character information having a character pitch of 12 characters/inch and start address register 90 may be provided for character information having a character pitch of 10 characters/inch. With this arrangement, start address registers 88 and 90 provide for the same number of characters to be horizontally scrolled, in each horizontal line, regardless of the character pitch, as will be more apparent from the discussion hereinafter. It is to be appreciated that the number of start address registers may be varied in accordance with the number of character pitches utilized. On the basis of the character pitch information CP supplied to selecting circuit 60, the latter circuit selects the start address information from either start address register 88 or start address register 90 and writes the same into memory address counter 64. As previously discussed, memory address counter 64 is synchronized with the scanning of the CRT screen and supplies a signal to line buffers 54 and 56 to read out the information therefrom, whereby the information displayed on the CRT screen is horizontally scrolled line by line to a selected position. Since the scanning by the CRT occurs extremely fast, the operator views the displayed lines as moving simultaneously in the horizontal direction on the screen.

In addition, a line pitch switching circuit 62, as previously discussed, is supplied with the line pitch code LP from function decoder 52, and is also supplied at its clock input terminal CK with the horizontal synchronizing signal H from synchronizing signal circuit 68 and at its reset input terminal R with the vertical synchronizing signal V from synchronizing signal circuit 68. In response to these signals, line pitch switching circuit 62 supplies a line switch signal to ROM 72 for varying the line pitch of the information to be displayed on the screen of CRT 40. Example of line pitches that can be used with the present invention are 6 lines/inch, corresponding to a spacing of twenty dots between the bottom of one line and the bottom of the next adjacent line, 4 lines/inch, corresponding to a thirty dot spacing between lines, 3 lines/inch, corresponding to a forty dot spacing between adjacent lines, and 2 lines/inch, corresponding to a sixty dot spacing between adjacent lines. It is to be appreciated that the 3 lines/inch and 2 lines/inch lines therefore correspond to double spacing of the 6 lines/inch and 4 lines/inch lines.

It should be appreciated that, with the above apparatus, information having different character pitches and different line pitches can simultaneously be displayed on the same CRT screen. Further, as will be apparent hereinafter, the word processing apparatus according to this invention is capable of performing vertical and horizontal scroll operations.

The vertical scroll operation will first be described. In many instances, it is desirable to provide a split screen on the CRT. For example, a dividing line may split the screen into two equal halves with an upper portion and a lower portion. With this arrangment, the upper portion, for example, can be vertically scrolled, that is moved in the vertical direction line by line, while the displayed information on the lower portion remains stationary. If a constant line pitch is used with the information displayed on the CRT screen, no problem arises when the information on the screen is vertically scrolled. However, if information having different line pitches is simultaneously displayed on the screen, during the vertical scroll operation, one of the lines may intersect the dividing line. For example, a displayed horizontal line may be split, in the vertical direction, by such dividing line with only the upper half of the letters or other characters being displayed on the upper portion of the screen. One method of preventing this occurrence is to permit the dividing line to move in the vertical direction, rather then fixing the position of the dividing line in RAM 48. In such case, if a line is intersected by the dividing line, such line is moved up or down to eliminate or include the line in the upper portion of the screen. This method, however, may be undesirable from the viewpoint of providing hardware to perform such function. Further, such movement of the dividing line may change the information displayed on the lower portion of the screen which is not vertically scrolled. It is therefore desirable to maintain the dividing line at the same position, while also preventing the aforementioned problem of the dividing line intersecting the last line on the upper portion of the screen.

This vertical movement or displacement of the dividing line can be prevented by a line pitch adjustment method. With this method, each line pitch is weighted by a constant. For example, as shown in FIG. 5, line pitches of 6 lines/inch, 4 lines/inch, 3 lines/inch and 2 lines/inch are weighted with constants 2, 3, 4 and 6, respectively. A variable termed the sum of the constant is defined as the weighted constant for the line pitch times the number of lines displayed on the screen with such line pitch, and has a maximum value of 128. Thus, for example, if all of the lines on the CRT screen have a line pitch of 6 lines/inch, 64 lines can be displayed on the CRT screen with such line pitch, since the weighted constant 2×64 lines=128. If a constant line pitch of 4 lines/inch is used with all of the lines displayed on the screen, 42 lines can be displayed since the weighted constant 3×42 lines=126. Therefore, if the dividing line equally divides the screen, the dividing line has a position corresponding to the sum of the constant equal to 64. In other words, the upper and lower portions of the screen each have a sum of the constant associated therewith equal to 64.

In order to eliminate the vertical displacement of the dividing line on the screen of CRT 40, it is only necessary to adjust the line pitch of the final displayed line so that the sum of the constant always equals 64. A method for so adjusting the line pitch of the final line will now be described with reference to FIG. 6. For example, assuming that the line pitch of the last line is 6 lines/inch and therefore has a weighted constant of 2, and that the sum of the constant equals 63 so that a shortage of one exists, the line pitch of the final line is converted to 4 lines/inch. In this manner, the weighted constant of the last line is changed from its original value of 2 to a new value of 3, whereby the sum of the constant equals 64 and no shortage results. When the line pitch of the last line is 4 lines/inch, the weighted constant associated therewith is equal to 3 and, in such case, a shortage of 1 or 2 with respect to the sum of the constant equal to 64 can exist. In other words, the sum of the constant may be equal to 62 or 63. In the case where a shortage of 1 exists, the line pitch of the last line is converted from 4 lines/inch to 6 lines/inch. In such case, the shortage of 1 is converted to a shortage of 2. Therefore, a dummy or blank line 2DL having a line pitch of 6 lines/inch and therefore a weighted constant of 2 is added as the final line so that a sum of the constant equal to 64 is produced and whereby no shortage results. It should therefore be appreciated that, for a line pitch equal to 4 lines/inch having a weighted constant of 3, where a shortage of 2 exists, the sum of the constant equal to 64 is obtained merely by adding the dummy line 2DL to eliminate such shortage. In like manner, for a last line having a line pitch of 3 lines/inch or 2 lines/inch with weighted constants of 4 or 6, respectively, the line pitch of the last line is adjusted in a similar manner, as shown in the table of FIG. 6. In such case, an additional dummy line 3DL may be used and corresponds to a blank line having a line pitch of 4 lines/inch and a weighted constant of 3. It should be appreciated that, with the above method, vertical movement of the dividing line is prevented and the sum of the constant is maintained equal to 64.

With the above method, the line pitch of the last line is adjusted and then stored in RAM 22. Although the dividing line on the screen is not moved in the vertical direction, a temporary flickering or fluctuation of the dividing line on the screen may be produced when the last line, while being adjusted, is intersected by the scanning of the CRT screen. To prevent such flickering or fluctuation, the character information excluding the line pitch information is shifted in the vertical direction, that is, vertically scrolled, by DMA 46. After a start signal from the hardware of the apparatus, which may substantially correspond to a vertical synchronizing signal, is detected, the corrected or adjusted line pitch information is then substituted during a blanking period of the video signal. Since it takes several milliseconds for the scanning line of the hardware to arrive at the center of the CRT screen after transmission of the start signal, if the correct line pitch information is substituted at such time, that is, after the start signal from the apparatus is detected, the lines on the screen can be viewed as being substantially stationary. If, on the other hand, the line pitch information is adjusted during, for example, the scanning by the apparatus of the upper portion of the divided screen, it is likely that the substitution of the line pitch information may be overtaken by the scanning of the CRT screen, that is, before the line pitch information is adjusted. Accordingly, by adjusting the line pitch information during, for example, the vertical blanking period, this problem is avoided. In this manner, since the scanning of the screen occurs during a period of several ten milliseconds, CPU 20 is provided with sufficient time for performing the line adjustment operation.

Figure 7A:
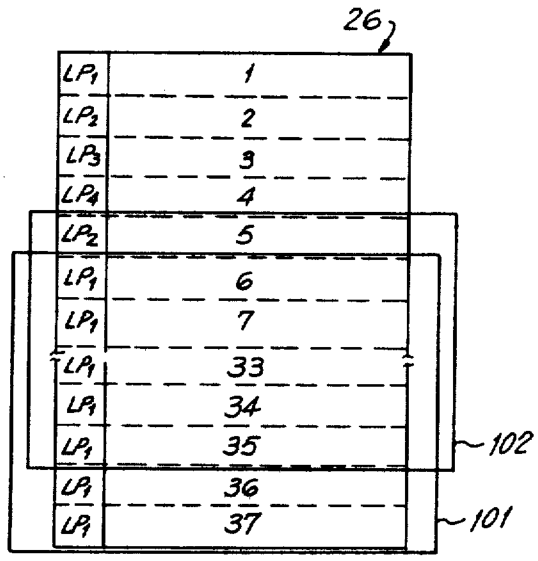
FIGS. 7A–7C are schematic diagrams used for explaining the vertical scroll operation performed by the apparatus of FIG. 2.
Figure 7B:
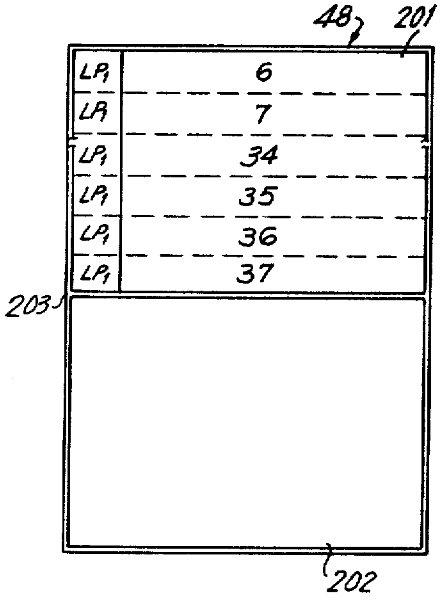
Figure 7C:
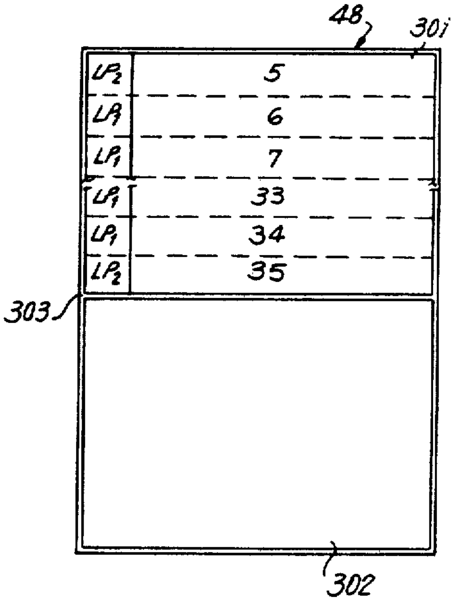

Referring now to FIG. 7, an example of the vertical scroll operation will now be described. As shown in FIGS. 7B and 7C, RAM 48 is equally divided by a dividing line 203, 303 into an upper portion 201, 301, respectively, and a lower portion 202, 302, respectively, corresponding to upper and lower portions on the screen of the CRT. As a first example, an area 101 of data, including horizontal lines 6–37, which is stored in RAM 26, is also stored in upper portion 201 of RAM 48, as shown in FIG. 7B. The information stored in RAM 48 can then be used with the software and hardware of the apparatus, for example, the hardware is adapted to sequentially scan from an uppermost to a lowermost portion of RAM 48 to produce a video signal which is supplied to CRT 40. Corresponding line pitch information LP1–LP4 is added to an upper portion of RAM 48 in, for example, one line thereof, for each line of information stored in RAM 48, in a form previously discussed with reference relating to FIGS. 3 and 5. It is to be further appreciated that, for the area 201 in the upper portion of RAM 48, the sum of the constant equals 64 since the line pitch of each line is 6 lines/inch having a weighted constant of 2 such that 2×32 lines=64.

The case will now be discussed in which it is desired to vertically scroll the information stored in the upper portion of RAM 48 so that the contents of portion 201 are changed to the contents shown in portion 301, whereby information containing lines 5-35 from RAM 26 will be displayed in the upper portion of RAM 48. In particular, line 5 is first displayed at the uppermost portion on the screen of CRT 40 by a vertical scroll operation. The line pitch information is then calculated line by line, as described above, to determine how many lines from line 5 can be displayed without exceeding the sum of the constant equal to 64. Since the line pitch of lines 6-35 is 6 lines/inch having a weighted constant of 2 and line 5 has a line pitch of 4 lines/inch having a weighted constant of 3, the sum of the constant is equal to $2\times30$ lines$+3\times1$ line$=63$, whereby a shortage of 1 results. Accordingly, from the table in FIG. 6, since the last line 35 has a line pitch of 6 lines/inch with a shortage of 1, the line pitch of the last line is changed from 6 lines/inch to 4 lines/inch and the weighted constant is changed from 2 to 3 so as to eliminate such shortage. Thereafter, the character information within area 201 is moved downwardly line by line until line 5 is positioned as the uppermost line on the display, as shown in area 301 of FIG. 7C. However, at such time, the line pitch information in area 201 is not adjusted, but rather, remains the same, since the time pitch information remains as shown in area 201 with the sum of the constant equal to 64. Therefore, at such time, it should be appreciated that the dividing line 303 and lower portion 302 of RAM 48 do not move at all. Upon detection of the aforementioned start signal, the correct line pitch information, as adjusted above, is stored in area 301 with the already scrolled character information in area 301 and displayed on the screen of CRT 40. No problem of fluctuation or flickering occurs since as previously discussed, there occurs a ten millisecond lapse, after the start signal has been supplied, for the scanning of the CRT screen to arrive at the center of the screen. It is to be appreciated that a lower portion on the CRT screen, corresponding to the information stored in areas 202 or 302 of RAM 48 does not move during the vertical scroll operation of the upper portion of the screen.

Figure 8A:
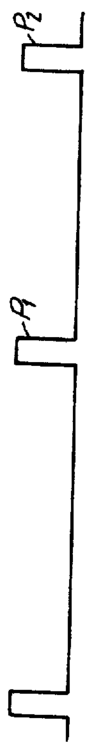
FIGS. 8A–8C are schematic diagrams used for explaining the arrangement of character information having different character pitches.
Figure 8B:
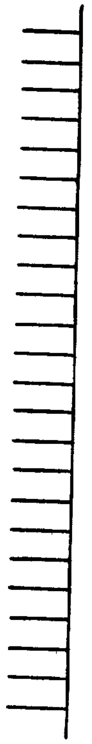
Figure 8C:
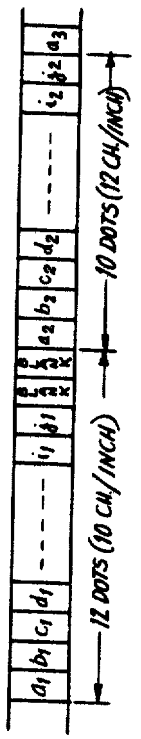

Before describing the horizontal scroll operation, a description will first be given of the display of information having different character pitches on the same CRT screen, that is, the control of the pitch or distance between characters to be displayed on the screen in response to the character pitch code CP. As previously described, the character pitch code CP is decoded by function decoder 52 and then supplied to character pitch switching circuit 58 and selecting circuit 60. Character pitch switching circuit 58 may include a presettable hexadecimal counter which is preset to 4 for a character pitch of 10 characters/inch and is preset to 6 for a character pitch of 12 characters/inch. Thus, for example, for a character pitch of 10 characters/inch, the presettable hexadecimal counter produces a carry signal or load clock signal $P_1$, as shown in FIG. 8A, after each 12 clock pulses from clock signal generator 66. The load clock signal $P_1$ is then supplied to the clock input terminal CK of memory address counter 64. As previously discussed, memory address counter 64 supplies an address signal to line buffers 54 and 56 for causing character information to be read out therefrom and to be supplied through separating circuit 70 to font ROM 72, in which the encoded character information is converted into a 12-bit parallel dot video signal corresponding thereto. The parallel dot video signal is then shifted sequentially in serial-to-parallel convertor 74 in accordance with the clock pulses from clock signal generator 66, as shown in FIG. 8B. In this manner, the 12-bit parallel dot video signal is converted to a serial dot video signal of 12 bits, comprised of 10 bits of character information $a_1$ to $j_1$ and 2 blank bits which function to provide a space between this and the next character, as shown in FIG. 8C. This serial dot video signal, as shown in FIG. 8C, is then supplied to processing circuit 76 and corresponds to one character to be displayed on the CRT screen. The above operation is employed continuously for the information as long as the character pitch of 10 characters/inch is not changed.

For a character pitch of 12 characters/inch, the presettable hexadecimal counter generates a carry signal or load clock signal $P_2$, as shown in FIG. 8A, each time that 10 clock pulses from clock signal generator 66 are counted. The load clock signal $P_2$ is then supplied to the clock input terminal CK of memory address counter 64. Accordingly, memory address counter 64 supplies an address signal to line buffers 54 and 56 to cause the encoded character information to be read out therefrom and supplied through separating circuit 70 to font ROM 72 which, in response thereto, produces a 10-bit parallel dot video signal. The parallel dot video signal is then sequentially shifted bit by bit by the clock pulses supplied to parallel-to-serial converting circuit 74 in the same manner as previously described above in regard to the character pitch of 10 characters/inch. In this manner, a serial dot video signal comprised of 10 bits or dots $a_2$ to $j_2$, as shown in FIG. 8C, is produced and supplied to processing circuit 76 as the video signal for displaying one character of information. This operation is performed for each character as long as the information has a character pitch of 12 characters/inch. It should therefore be appreciated that the character pitch of the information displayed on the screen of CRT 40 can be easily controlled so that information having mixed character pitches can be readily displayed.

A description of the horizontal scroll operation where information having different character pitches is displayed in a mixed state on the CRT screen, will now be given with reference to FIGS. 9-13. It is to be first noted that, in one horizontal scroll operation according to the prior art, the encoded character information which is stored in RAM 48 is rewritten therein to contain the information to be displayed on the screen after the horizontal scroll operation. In another method according to the prior art, the rows of encoded character information stored in RAM 48 are not moved, but rather, the addresses at which the information is first read out from RAM 48 are changed.

Figure 9:
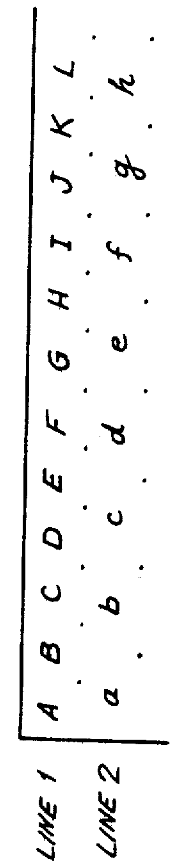
FIGS. 9–13 are schematic diagrams used for explaining the horizontal scroll operation performed by the apparatus of FIG. 2.
Figure 10:
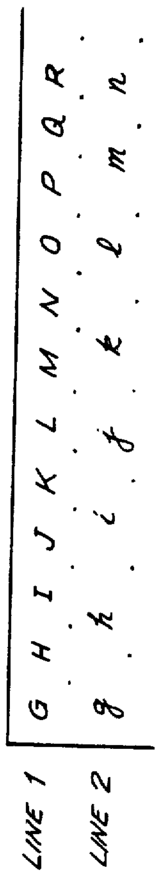

Referring first to FIG. 9, first and second lines are displayed on the screen of CRT 40 and have character pitches of 12 characters/inch and 10 characters/inch, respectively. If the displayed lines are scrolled to the left in the horizontal direction on the screen, character by character, for a total of six characters, a misalignment between the lines will result, as shown in FIG. 10. In particular, where the character "G" on the first line was originally positioned substantially directly over the character "e" in the second line before the horizontal scroll operation, the character "G" on the first line is positioned substantially directly over the character "g" in the second line after the horizontal scroll operation. Thus, if the character information is scrolled character by character, a relative displacement between the characters in lines having different character pitches results.

Figure 11:
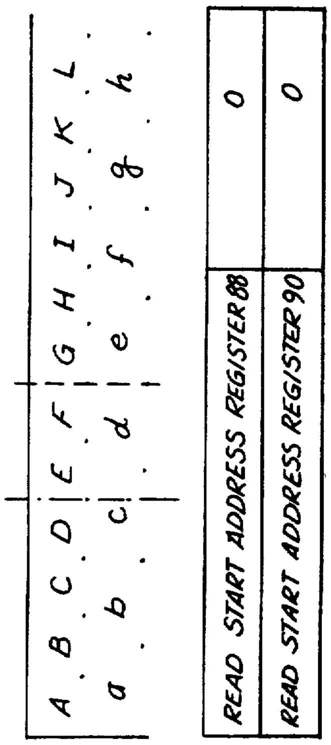
Figure 12:
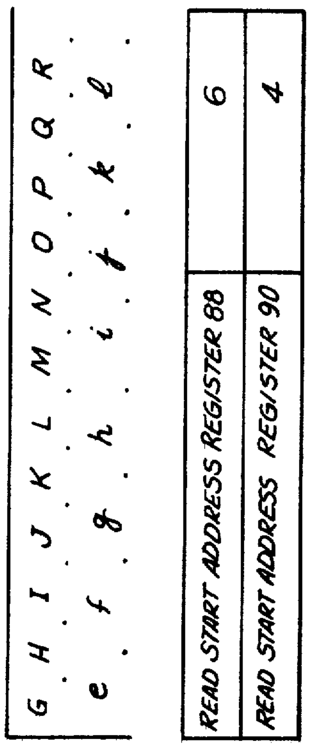

The present invention avoids this problem. In this regard, read start address registers 88 and 90, used for different character pitches, are provided to prevent relative displacement of the characters and lines during the horizontal scroll operation. In particular, command decoder 86, in response to a command signal from CPU 20, supplies an address signal to address setting circuit 82 to determine the position along the line which is to be displayed first in the horizontal scroll operation. Address setting circuit 82, in response to the output from command decoder 86 and the address information from interface circuit 84, supplies this address signal, represented by the dashed vertical line in FIG. 11, to registers 88 and 90. Thus, for example, if start address register 88 corresponds to a character pitch of 12 characters/inch and start address register 90 corresponds to a character pitch of 10 characters/inch, for an address corresponding to the dashed line in FIG. 11, start address register 88 determines that only 6 characters should be moved to the left in the horizontal direction while start address register 90 determines that 4 characters should be moved to the left in the horizontal direction on the CRT screen. Both start address registers 88 and 90 supply the character address signal to selecting circuit 60. Since the first line has a character pitch of 12 characters/inch, selecting circuit 60, in response to the character pitch code CP from function decoder 52 only gates the output of start address register 88 to memory address counter 64. In this manner, memory address counter 64 provides that the character information stored in line buffers 54 and 56 be read out, starting with the sixth character, that is, character "G", in the first line. Thus, as shown in FIG. 11, before the horizontal scroll operation is performed, start address register 88 has an address corresponding to the zero position on the first line and, after the horizontal scroll operation is performed, start address register 88 produces a start signal corresponding to the sixth or "G" letter on that line, as shown in FIG. 12.

Figure 13:
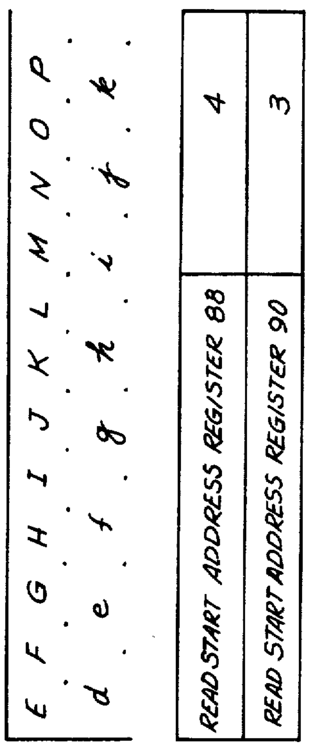

In like manner, for the second line of letters, selecting circuit 60, in response to the character pitch code CP from function decoder 52 only gates the output from start address register 90, used for character pitch information of 10 characteres/inch, to memory address counter 64. Thus, start address register 90, as previously discussed, determines that the second line should be shifted to the left by four characters. Accordingly, the relative position between the characters in the first and second lines remains the same. In the same manner, if the first and second lines are to be horizontally scrolled to the left to a position corresponding to the dot-dash line in FIG. 11, start address register 88 causes the first line to be shifted to the left by four characters and start address register 90 causes the second line to be shifted to the left by three characters to maintain the relative positions therebetween. It should be appreciated that although the relative positions of the characters in the lines of FIGS. 12 and 13 are not exactly identical to that shown in FIG. 11, the relative deviation between the characters of the two lines in each figure, for example, the character "G" in the first line and "e" in the second line, never varies more than ½ character pitch. After memory address counter 64 selects the first character to be displayed on the CRT screen, the reading out of data from line buffers 54 and 56 is incremented synchronously with the scanning of the CRT screen in response to the character pitch clock signal from character pitch switching circuit 58 so that the information displayed on the CRT screen has a correct character pitch.

It should therefore be appreciated that, by use of read start address registers 88 and 90, each being used for information having a different character pitch, relative displacement between the characters on different lines having different character pitches is prevented during a horizontal scroll operation. Further, it is possible to display information having different line pitches on only a portion, for example, the upper half of the CRT screen. It should be appreciated that the number of divisions of the CRT screen and the dividing positions thereon can be freely selected, with each divided portion containing information having different line pitches simultaneously displayed thereon. In other words, the present invention is particularly suitable for use as a word processor or the like. Further, in accordance with this invention, information displayed on one of the divided portions of the screen can be vertically scrolled while information on another divided portion of the screen can remain stationary. Further, if information on one of the portions of the screen is vertically scrolled, the dividing lines between the divided portions on the screen will not change, but rather, the line pitch of the last line in such scrolled divided portion will be changed during a vertical blanking period whereby the divided line does not move vertically on the screen and no fluctuations thereof result.

Having described a specific preferred embodiment of invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Information processing apparatus comprising:
   - memory means for storing character information organized in blocks of data, and character pitch information corresponding to said character information associated with each of said blocks;
   - means for reading said character information and said character pitch information from said memory means;
   - display means for simultaneously displaying lines of characters corresponding to said character information, with each of said lines having a selected one of a plurality of character pitches and each of said blocks of character information corresponding to a respective one of said lines of characters; and
   - control means for controlling said display means in response to said character information and character pitch information read by said means for reading so that each of said lines of characters displayed on said display means has its selected character pitch determined by the character pitch information associated with said respective block.

2. Information processing apparatus according to claim 1; in which said control means includes buffer means for storing said character information read from said memory means by said means for reading, character pitch switching means for producing a character pitch clock signal in response to said character pitch information read from said memory means, means for supplying said character pitch information to said character pitch switching means, and counter means for reading out said character information stored in said buffer means at a rate determined by said character pitch clock signal.

3. Information processing apparatus according to claim 2; in which said means for supplying further includes separating means for separating said character information and said character pitch information read from said memory means and for supplying said separated character pitch information to said character pitch switching means, and said separating means also supplies said separated character information to said buffer means.

4. Information processing apparatus according to claim 3; in which said memory means also stores function information related to respective character information stored therein, said means for reading also reads said function information and said separating means separates said character information and said function information read from said memory means and supplies said function information to said buffer means in synchronism with the respective separated character information supplied to said buffer means.

5. Information processing apparatus according to claim 2; in which said control means further includes font memory means addressed by said character information read out from said buffer means for generating a dot video signal corresponding to said character information, and processing means for supplying said dot video signal to said display means.

6. Information processing apparatus according to claim 5; in which said buffer means also stores function information corresponding to said character information stored therein; and said control means further includes separating means for separating said character information and said function information read from said buffer means, and said processing means processes said dot video signal with said function information prior to supplying said dot video signal to said display means.

7. Information processing apparatus according to claim 1; in which said control means includes buffer means for storing said character information read from said memory means by said means for reading, counter means for reading out said character information stored in said buffer means, and start address means for controlling said counter means to read but said character information from said buffer means, starting with a selected character, in response to said character pitch information read from said memory means, so that said control means controls said display means in response to said character pitch information to perform a horizontal scroll operation consisting of a horizontal shift of each line of characters displayed by said display means.

8. Information processing apparatus according to claim 7; in which said start address means includes start address setting means for producing a start address signal corresponding to a desired position to which said displayed line of characters is to be shifted by said display means during said horizontal scroll operation, and start address register means for determining said character information corresponding to said selected character which is to be first read out from said buffer means in response to said character pitch information read from said memory means and said start address signal from said start address setting means.

9. Information processing apparatus according to claim 8; further including central processing means; and in which said start address setting means includes interface means for producing address information in response to said central processing means, command decoder means for producing a start address command signal in response to said central processing means, and a start address setting circuit for producing said start address signal in response to said address information from said interface means and said start address command signal from said command decoder means.

10. Information processing apparatus according to claim 8; in which said start address register means includes a start address register for each character pitch with which said character information is adapted to be displayed by said display means, each start address register determining a selected character which is to be first read out from said buffer means in accordance with the character pitch associated with the respective start address register and each start address register producing a start address character signal in response thereto; and selecting means for gating one of said start address character signals to said counter means in response to said character pitch information stored in said memory means.

* * * * *